United States Patent
Dawson et al.

(10) Patent No.: US 8,392,839 B2
(45) Date of Patent: Mar. 5, 2013

(54) SYSTEM AND METHOD FOR USING PARTIAL TELEPORTATION OR RELOCATION IN VIRTUAL WORLDS

(75) Inventors: Christopher J. Dawson, Arlington, VA (US); Rick A. Hamilton, II, Charlottesville, VA (US); Michael D. Kendzierski, New York, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 12/548,712

(22) Filed: Aug. 27, 2009

(65) Prior Publication Data
US 2011/0055727 A1 Mar. 3, 2011

(51) Int. Cl.
*G06F 3/00* (2006.01)
(52) U.S. Cl. .................. 715/757; 715/848; 715/850
(58) Field of Classification Search .................. 715/757, 715/850, 848
See application file for complete search history.

(56) References Cited

U.S. PATENT DOCUMENTS

| | | | | |
|---|---|---|---|---|
| 5,405,151 A * | 4/1995 | Naka et al. | ............... | 463/31 |
| 5,513,307 A * | 4/1996 | Naka et al. | ............... | 345/474 |
| 5,963,218 A * | 10/1999 | Naka et al. | ............... | 345/474 |
| 7,269,632 B2 | 9/2007 | Edeker et al. | | |
| 7,710,429 B2 * | 5/2010 | Smith | ............... | 345/581 |
| 8,171,408 B2 * | 5/2012 | Dawson et al. | ............... | 715/706 |
| 2005/0086301 A1 * | 4/2005 | Eichler et al. | ............... | 709/204 |
| 2007/0288598 A1 * | 12/2007 | Edeker et al. | ............... | 709/217 |
| 2008/0134056 A1 * | 6/2008 | Shuster | ............... | 715/757 |
| 2008/0263460 A1 * | 10/2008 | Altberg et al. | ............... | 715/757 |
| 2009/0051752 A1 * | 2/2009 | Lammers | ............... | 348/14.01 |
| 2009/0179895 A1 * | 7/2009 | Zhu et al. | ............... | 345/424 |
| 2009/0241036 A1 * | 9/2009 | Reisinger | ............... | 715/757 |
| 2010/0162149 A1 * | 6/2010 | Sheleheda et al. | ............... | 715/764 |
| 2010/0164947 A1 * | 7/2010 | Bolger et al. | ............... | 345/419 |
| 2010/0169795 A1 * | 7/2010 | Hyndman et al. | ............... | 715/757 |
| 2010/0332998 A1 * | 12/2010 | Sun et al. | ............... | 715/757 |
| 2011/0029897 A1 * | 2/2011 | Russell | ............... | 715/757 |
| 2011/0055136 A1 * | 3/2011 | Hamilton et al. | ............... | 706/47 |

* cited by examiner

*Primary Examiner* — Ryan Pitaro
(74) *Attorney, Agent, or Firm* — Whitham, Curtis, Christofferson & Cook, P.C; Lisa J. Ulrich (57) ABSTRACT

The processing burden of rendering incident to a full teleportation operation in a virtual universe is avoided while contact with particular teleport destinations is promoted by provision of a partial teleportation facility such as a virtual kiosk as an object within a virtual universe (which may be sponsored or owned by users wishing to promote particular teleportation destinations) at which an avatar can view previously rendered images of portions of one or more teleportation destinations. Limited interaction and simulated travel within the teleportation destination can be achieved through image manipulation and updates rather than rendering. An avatar image can be displayed in connection with both the object and the teleport destination with, preferably control of only one avatar image while the other is displayed using a low resolution image. Full teleportation can be initiated automatically upon detection of a particular condition such as duration of an avatar presence at the location of the partial teleportation facility object. When full teleportation is initiated, the processing intensive rendering can be supplemented from image data representing the portion or the teleportation destination, thus hiding rendering delays and simulating seamless, instantaneous response to the full teleportation operation.

21 Claims, 5 Drawing Sheets

After partial teleportation split screen virtual user (anchored to original virtual world)    Partially teleported virtual user (reduced capacity in new world)

SYSTEM AND METHOD FOR USING PARTIAL TELEPORTATION OR RELOCATION IN VIRTUAL WORLDS

FIELD OF THE INVENTION

The present invention generally relates to the production and management of interactive virtual universes presented to users on computers linked by a network and, more particularly, to previewing relocation in or between virtual universes, sometimes referred to as teleportation.

BACKGROUND OF THE INVENTION

Closely following the introduction of computer generated graphic representations of objects, computers games have been developed and have become popular to the point of becoming a significant industry. A significant factor in the continuing popularity of such games may possibly be the fact that the simulated venue or environment in which the game is played is limited only by the imagination of the game developer and can be presented to a viewer on a display with a realistic appearance which is limited only by the hardware and software employed to render associated images. Moreover, such simulated environments may be changed at will and very rapidly with rules of the game often being altered with the simulated environment. Connection of computers through networks such as the Internet have also allowed interactive participation in the same game simultaneously or at will by numerous participants.

As a synthesis of such games with other capabilities of the Internet such as interactive chat rooms, advertising and marketing and access to massive amounts of information and the like, so-called virtual universes (sometimes referred to as "metaverses" or "3D Internet") have been developed and made available to the public in recent years. A virtual universe (VU) is a computer-based simulated environment intended for users thereof (referred to as "residents" or "agents") to inhabit, traverse and interact through the use of avatars. An avatar, in the context of a VU, is a graphical representation of a user which has an appearance that is freely selectable that the user can control and other participants can see, often taking the form of a cartoon-like human which can move through the regions of the virtual universe represented by 3D graphics and landscapes. Such 3D graphics and virtual landscapes may or may not resemble the real world in terms of physical laws, building environments, geography and landscapes. Some examples of virtual universes available to the public include Second Life® ("Second Life" is a trademark of Linden Research, Inc. in the United States and/or other countries), Entropia Universe™ ("Entropia Universe" is a trademark of Mindark PE AB in Sweden and/or other countries), and There ("There" is a trademark of Forterra Systems, Inc. in the United States and/or other countries). Examples of massively multiplayer online games include EverQuest® ("EverQuest" is a trademark of Sony Online Entertainment, LLC in the United States and/or other countries), Ultima Online® ("Ultima Online" is a trademark of Electronic Arts, Inc. in the United States and/or other countries) or World of Warcraft World of Warcraft® ("World of Warcraft" is a trademark of Blizzard Entertainment, Inc. in the United States and/or other countries). Publicly available virtual universes and/or massively multiplayer online games are operated by persons or companies who provide servers to generate portions of the VU and which may impose a charge for participation as a resident, to establish a particular object or environment (sometimes referred to as an "island") within the VU, present advertising and the like or combinations thereof. In short, an avatar controlled by a resident can interact with other avatars, objects and portions of the immediate environment of the avatar in much the same way a person would interact with other persons, objects and portions of the environment in the real world but where transportation between portions of the VU may be nearly instantaneous (e.g. referred to as "teleporting") and objects and local environments within the VU may be entirely developed at will to resemble the real world closely, not at all or with any degree of realism or fantasy in between which may be provided by the administrator of the VU or users of the VU, often for a not insubstantial fee. Further, once such objects or local environments become part of a VU, fees can be charged for use made of them through avatars. On the other hand, many entities have found it advantageous to provide environments closely resembling real world facilities or locales to allow users to experience, though avatars and with a significant degree of realism, particular locales in the real world and a sampling of the likely inhabitants thereof.

In general, virtual universes provide for avatars to be relocated at will within a virtual universe substantially instantaneously by a process generally referred to as teleporting. However, while the processing burden is significant, it has been found that most teleportations result in a return teleportation after an extremely abbreviated visit for any of a number of reasons. Accordingly, teleportations may constitute a substantial portion of the overall processing burden of a VU and may compromise the quality of the VU experience for users while increasing costs of maintaining the VU.

SUMMARY OF THE INVENTION

It is therefore an object of the present invention to provide a technique for proving a preview of a teleport destination with minimal processing burden on a virtual universe (VU) system.

It is another object of the invention to provide a location in a VU where an avatar and corresponding resident can preview and have a limited interaction with a teleport destination.

It is a further object of the invention to provide a non-intrusive interface for controlling the partial teleportation in accordance with the invention as well as an alternative and easily used interface with enhancements for full teleportation operations.

It is yet another object of the invention to provide for promotion of particular teleportation destinations without significantly increasing processing loads in a virtual universe system.

In order to accomplish these and other objects of the invention, a method for previewing a teleportation destination in a virtual universe is provided for performing steps of establishing a location in the virtual universe at which a partial teleportation can be performed, caching an image of a portion of a teleportation destination, moving an avatar to the location in said virtual universe, and, in response to moving the avatar to the location, displaying an image of a portion of the teleportation destination to a user corresponding to the avatar.

In accordance with another aspect of the invention, a virtual universe system is provided including an object at a location within the virtual universe from which partial teleportation can be performed, a location comparator for determining presence of an avatar at the location, an image cache for storing data representing an image of a teleportation destination, and an image generator for displaying the image of the teleportation destination, responsive to detected presence of the avatar at the location.

In accordance with a further aspect of the invention, a method of presenting an image of a teleportation destination in a virtual universe is provided comprising defining an object at a location in the virtual universe at which partial teleportation may be performed, and displaying a portion of a selected teleportation destination in connection with said object when an avatar is located at the location without teleportation of the avatar to the destination.

In accordance with yet another aspect of the invention, a computer program product is provided comprising a computer readable medium or a communication link providing signals comprising a program to a data processor, said program, when run on said data processor, causing said data processor to perform steps of establishing a location in a virtual universe at which a partial teleportation can be performed; caching an image of a portion of a teleportation destination; moving an avatar to said location in said virtual universe; and in response to said step of moving an avatar to said location, displaying said image of a portion of said teleportation destination to a user corresponding to said avatar.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE MENTION

Figure 1:
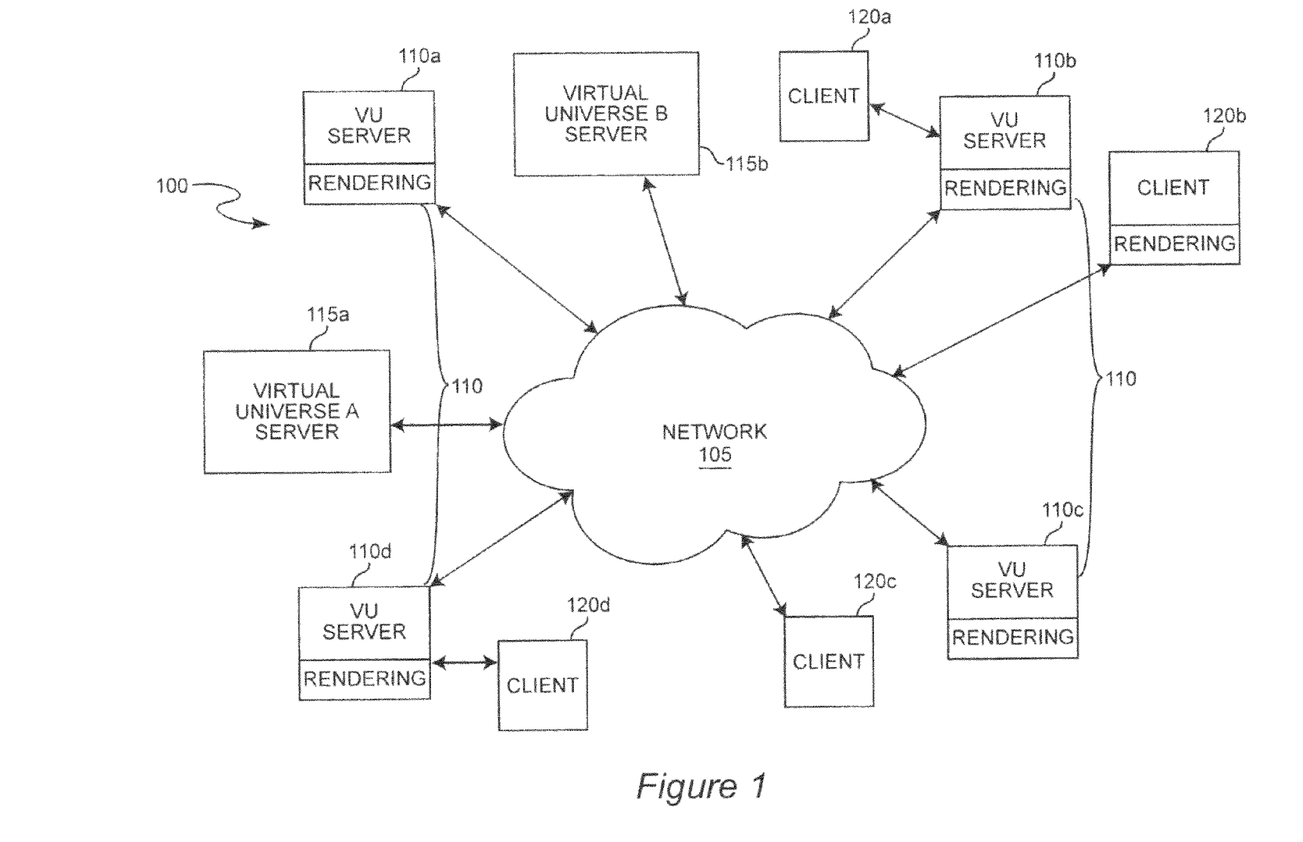
FIG. 1 is a high-level block diagram or data flow diagram of a network-based virtual universe.
Figure 2:
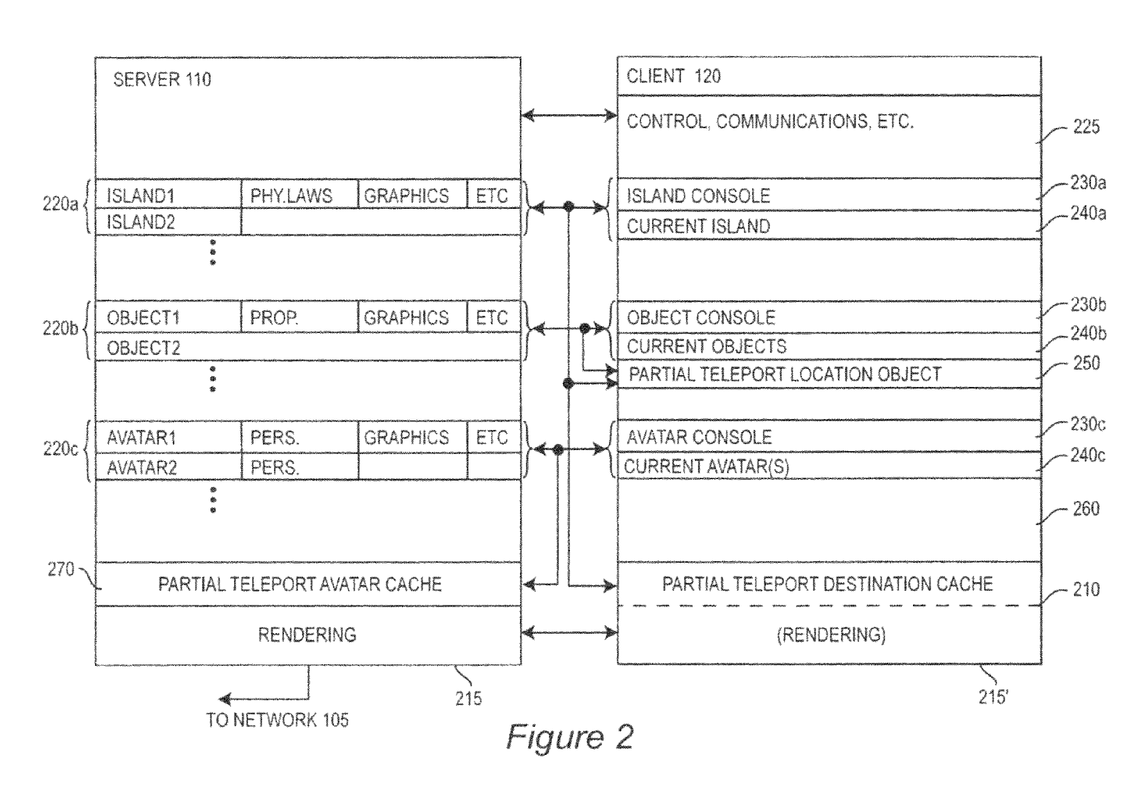
FIG. 2 is a similarly high-level block diagram of some details of the client 120 and server 110 generally provided for participation in a virtual universe.

Referring now to the drawings, and more particularly to FIG. 1, there is shown a high-level diagram of a network implementing a virtual universe (VU). FIG. 2 is a similarly high-level block diagram illustrating functional relationships between a client terminal and a server implementing a VU and between which network 105 may or may not be interposed. FIGS. 1-2 are principally arranged to facilitate an understanding of the overall general operation of a virtual universe and do not and are not intended to represent any particular known implementation of a VU. Further, at the level of abstraction with which a VU is represented in FIG. 1, the VU illustrated may or may not include the invention and no portion of FIG. 1 or 2 is admitted to be prior art in regard to the invention. It should also be borne in mind that VU implementations have become relatively sophisticated and the underlying technology relatively mature such that enhancements thereto, such as those provided by the present invention, must be interoperable with existing network and VU infrastructure.

It should also be recognized that operation of a VU is extremely processing intensive and, while large amounts of computing resources may be accessible through a network, graphics generation and rendering must be distributed and managed in such a way as to provide images of portions of the VU in a very short period of time in order to be acceptable to residents of the VU, particularly in regard to updating views as avatars are manipulated and as teleportation between islands of the VU occur. Further, substantial portions of the control of avatars must be automated in order to keep the manipulation effort required of a resident within reasonable bounds while providing meaningful and reasonably logical and realistic interactions with environments, objects and other avatars. Thus, to reduce the number of avatar control parameters which must be controlled by a user to a practical level, each environment/island, object and avatar must be personalized (e.g. have a personality, properties, including ownership and the like) as well as many properties and attributes (e.g. behaviors and defaults) which must be transmitted efficiently, generally as metadata, between potentially a large number of processors which perform the rendering thereof and the rendering distributed in some form to the terminals through which residents interact with the VU.

More specifically, as illustrated in FIG. 1, the overall network and system 100 will be recognized as substantially the same as that of the Internet. Other functional elements such as firewalls, proxies and the like may be included for purposes of security, reliability and the like but are not important to the successful practice of the invention. Network 105, such as the Internet, provides communications between all VU servers 110a-110d and at least one virtual universe server 115a or 115b which establishes the basic VU topology, characteristics, rules and the like and maintains membership and billing information in regard to residents (users). VU servers 115a, 115b may be distributed servers for a single VU in order to provide some distribution of the processing load and to enhance communications but, for purposes of conveying a more complete understanding of the invention, could also represent VU servers of distinct virtual universes established and managed by different real world entities or companies. Clients 120a-120d are essentially user terminals and may communicate with the network 105 and VU server 115a and/or 115b either directly or through a VU server although that distinction is unimportant to the practice of the invention, as well.

In the following discussion, the term "rendering" will be used to denote the entirety of processing performed on the definitions of landscapes, environmental features, avatars and/or objects as contained in metadata in order to produce signals which can be used to drive a display to produce a graphical image. Such processing will, for example, include projection of the location of an object in the virtual environment to a location in a two-dimensional representation from a particular viewing point, positioning and orienting geometric coordinates of graphic primitives approximating environment features, objects or avatars or parts thereof, making hidden line calculations, generating surface textures, generating lighting and shading effects and their interactions between objects and the like to construct a scene and, as such, constitutes a substantial processing burden. As a practical matter in view of current communications bandwidth constraints, distribution of processing power and storage over a network, hardware and software compatibility and issues of data transmission delays and latency, some aspects of scenes are usually constructed at a server and transmitted over the network as positions, graphics primitives and geometric coordinates (sometime referred to as a pre-image) while hidden line and surface computations, generation of textures, lighting and shading effects and the like for final image presentation (which are well-developed and routine processes that can be performed on relatively inexpensive hardware such as a graphics card) are generally performed on such hardware in a client processor. However, the location where the rendering process or portions thereof are performed is not important to the practice of the invention while the critical aspect of rendering for VU performance is the overall processing load the entire process imposes on a VU system, particularly when teleportation is performed.

Referring now also to FIG. 2, the nature of communications generally depicted in FIG. 1 will be explained in greater detail but also with a degree of generality since many variations thereof may be employed. It will be readily understood by those skilled in the art that rendering of islands, avatars, objects and the like is perhaps the most processing intensive aspect of a virtual universe as well as being the most time-critical for performance which is acceptable to the user. Hardware, software and firmware for performing a convenient portion of the rendering is generally resident in each VU server 110 and the virtual universe server 115 but may be present to some degree (e.g. a graphics co-processor) at a client terminal 120 as depicted by dashed line 210 and parentheses in FIG. 2. In general, the servers 110, 115 will have the capability of arbitrating the most convenient/available location for the portion of the rendering performed on a server to be done most expeditiously. For example, when a rendering of a scene is required at, say, client 120*a* for interaction of a particular avatar with an object while changing location on an island, the rendering (including occlusion or hidden line processing) could be performed at the client, local server 110*b* or distributed over any or all of servers 110*a*-110*d* and possibly even including some client terminals (e.g. 120*b*) having rendering capability depending on rendering complexity (e.g. required image detail) and current processing loads of VU servers and clients. It should be appreciated that plural avatars for plural residents/users may be present in the same environment and that a different point of view may be required for the rendering presented to each resident/user.

Thus, the graphics to be presented to a user may be transmitted as a rendering or partial rendering to the network or a local client from a server (e.g. as primitives and geometric coordinates or even compressed graphics which may or may not be further modified at a local server or client processor) or, if rendering or avatars, objects or islands resident on a particular server are to be rendered on another processor, attributes such as the identity, physical laws, graphics definitions (e.g. primitives), etc. of an island, the identity, properties, graphics definitions, etc. of an object and/or personality, ratings, graphics definitions, etc. of an avatar are stored, preferably as metadata in servers 110 and transmitted as such to the processor which will actually perform the rendering and retransmission of the graphics. It should be appreciated that such attributes will be either constant or only infrequently or slowly changing and thus would be impractical and distracting to specify with each avatar command but can be automatically transmitted and retransmitted between servers, as needed, with avatar commands, controls and/or communications specified by the user/resident.

It should also be appreciated that client 120 will have appropriate controls and communications facilities (which are not generally hardware-dependent but can use available hardware interfaces such as a keyboard, mouse, camera, microphone or the like) collectively depicted at 225 of FIG. 2 which will preferably be resident on the client processor. In order to create islands, objects and avatars, some arrangement for doing so, preferably a graphic user interface (GUI) which may be in the form of one or more screens (possibly nested) functioning as a console 230*a*-230*c* may also be resident but are preferably downloaded from virtual universe server 115 through the local server. Such consoles allow particular attributes (e.g. locations, properties, personalities, graphics definitions and the like) to be specified and which are thereafter stored, preferably on an associated server 110 as depicted at 220*a*, 220*b* and 220*c* for islands, objects and avatars, respectively. Similar GUIs 240*a*-240*c* are also provided (but preferably resident on the client processor) for control of the current island, object and/or avatar, once it has been created. Suitable arrangements for providing GUIs or consoles 230*a*-230*c* and GUIs 240 are known and others providing enhanced user/resident convenience is foreseeable.

The current island (220*a*) with its associated objects (220*b*) correspond to the current location of the current avatar (220*c*) and are changed in accordance with teleportation to a different island when teleportation is performed in conventional VU systems. Such a change in the current island requires transfer of the metadata of the new island as well as authentication and other security procedures for the transfer of an avatar and rendering of the avatar and associated objects as well as the new island and objects therein. Therefore, teleportation represents a significant communication and rendering burden which requires significant time above the substantial processing burden for operating the VU to accommodate a number of users which is normally quite large. Further, it can be readily understood that the rapid growth of any particular VU with the frequent addition of islands and objects as well as the rapid growth in the number of users leads to users spending a relatively large fraction of their VU usage time in exploring the VU, itself, principally by teleporting. Accordingly, delays are often encountered in teleporting which are distracting to a user. Conversely, owners of particular islands such as businesses who may wish for their island to be visited find that delays in execution of a teleporting operation (particularly if the island is rendered with a high degree of fidelity to a real world site) reduce the number of visits made to such islands. The invention seeks to solve these problems of processing burden and teleport operation delays by means of a particular partial teleportation technique which will now be explained.

Some definitions which will be helpful in the following discussion are:

1. Avatar—an avatar is a graphical representation the user/resident selects that others can see, often taking the form of a cartoon-like human but which can be produced with any degree of detail, whether real or fanciful;

2. Agent—an agent is the user's account, upon which the user/resident can build an avatar and which is tied to an inventory of assets the user creates and/or owns;

3. Region—a region is a virtual area of land (e.g. a portion of an island or an environment associated therewith, such as an interior space in a building) within the virtual universe which typically resides on a single server;

4. Landmarks—a landmark is a map location that can be saved by a user (much in the manner of a "bookmark" in the Internet) and typically comprises a name and a map coordinate within the VU;

5. Friend/contact—a friend or contact is another user/resident of the VU which is maintained in one or more lists which allows a user to see when friends or prior contacts are online and provides a mechanism for contacting them directly using tools available with the list. It should also be appreciated that assets, avatars, the environment corresponding to a location and anything else visible in the virtual environment comprises universal unique identifiers (UUIDs) tied to geometric data (preferably distributed to users as textual coordinates), textures (preferably distributed to users as graphics files such as JPEG 2000 files) and effects data (preferably rendered by the user's client according to the user's preferences and user's device capabilities but could be otherwise rendered as discussed above).

Virtual universes may be traversed by such methods as walking, flying or teleporting. Generally, walking and flying provide for traversal of areas within an island while teleporting provides a mechanism to travel rapidly from one VU location/island to another VU location/island even if the locations are geographically (e.g. in the context of the topology of a particular VU) far apart. As indicated above, a user can teleport to any other location or VU of which be may be aware. However, since a major feature of virtual universes is to allow avatars of different users to interact as well as to increase user awareness of additional locations that may be of interest, one user may issue an invitation to another user in the form of an offer of teleporting an avatar of the recipient from the current location of the recipient's avatar to another location. The issuance of such invitations may function, in many cases, as an advertisement of the teleport destination that the issuer of the invitation wishes an avatar to visit and view, if only briefly. Known systems allow a recipient to accept or reject the invitation/offer of teleporting. If accepted, the avatar of the recipient is teleported from its current location to a location corresponding to the invitation/offer. However, as alluded to above, delays incident to such teleportation may increase the likelihood the an invitation will be declined or rejected by a user. As a solution to the increase of processing burden incident to teleportation and return and to the delays occasioned by such processing burden and the effects thereof on users of a VU, the invention provides a mechanism and method for partial teleportation in which the processing burden and delays are greatly reduced in regard to both rendering and updating and tracking avatar movements and actions throughout all of the virtual universes and locations therein incident to avatar teleportations while allowing an avatar to experience and explore islands of the VU much more easily and quickly and thus determine if a full teleportation with its attendant processing burden is desired through provision of a preview of potential teleportation locations with rapid system response time; providing an enhancement of the VU experience for users.

As an exemplary arrangement for practice of the invention to provide partial teleportation, several additional features are preferably provided in both the client and server. The particular partial teleportation arrangement in accordance with the invention provides one or more locations or sites (sometimes referred to hereinafter as facilities) within one or more islands of the VU at which partial teleportation can be performed. One or more such sites or facilities may be provided on any or all islands of a VU and each such site or facility may be dedicated to a single teleport destination or may represent several or many teleport destinations.

While provision of such partial teleportation sites may seem to be a limitation on flexibility of VU usage as compared to the capability for teleportation from any arbitrary location (e.g. any arbitrary location or geographic position within an island by known VU systems), partial teleportation, as provided by the invention allows the full teleportation operation of known systems to be maintained and also provides some enhancements closely simulating the capabilities of full teleportation without incurring the processing burden of doing so while providing some further effects which are very attractive to users such as a substantially non-intrusive, simple and convenient interface for controlling a partial teleportation function and, optionally, a "gateway" between islands. In this sense, such partial teleportation sites or gateways may be regarded as objects within an island having certain appearances and properties which may be more generally regarded as an environment or a structure and which may, in and of itself, be a destination in much the same manner as an island or an "island within and island". The properties and appearances of such a partial teleportation site are thus transmitted to a client and stored and processed as an environment feature or an object having a location within an island, as depicted at 250. An exemplary rendering of such a gateway may be and preferably is much in the nature of a virtual kiosk (which term may be used hereinafter to refer to a partial teleportation (PT) site, regardless of appearance) or visitors center in which a plurality of avatars may be present at any given time and which will be discussed in greater detail in connection with the exemplary renderings illustrated in FIGS. 4 and 5.

Other properties of the gateway are the views of potential teleport destinations that may be viewed by an avatar and its resident/user while at the gateway. If other avatars are present in the gateway, each may have a separate view of the partial teleport destination depending on the actions and position of each respective avatar in the gateway. The information from which these views are derived are stored at the client (or associated VU server) in a partial teleport destination cache 260 and are derived from renderings of another VU island; which renderings may already exist as image data and may be transmitted, for example, as compressed still images or a sequence thereof to simulate motion pictures with a frame rate or resolution which may be degraded to meet the communications bandwidth which may be available at a given point in time; avoiding the rendering burden altogether in many instances of partial teleportation (which would be required in full teleportation as provided by known VU systems) while reducing the communication burden both for transfer of avatar and associated object properties (e.g. of objects that may travel with the avatar).

Thus, when an avatar enters a partial teleport location or kiosk virtual facility, a number of images of the teleport destination which have generally been already rendered may be viewed by the avatar on virtual displays in the virtual facility. These images seen by the avatar are preferably presented as a split screen or frame-in-frame display in which a fraction of the display remains a view of the avatar in the partial (deport facility and the remainder will be one of a plurality of views of the teleport destination which may or may not include an image of the avatar. Other avatars which may already be present at the partial teleport facility will preferably be displayed as they would be, if present, in any other location in the VU since they will correspond to other avatars and their residents who are concurrently contemplating teleportation to the same island or islands to which the facility corresponds and may thus have a bearing on the desirability of an avatar to make a particular teleportation. For example, an avatar may interact with other avatars in the normal manner of known virtual universes while in the partial teleport facility and may thus discuss, for instance, features or qualities of the teleport destination and several avatars may make a joint decision to teleport together. Conversely, an avatar may decide against teleporting to a particular destination if it appears that one or more particular avatars known to the avatar and which the avatar may wish to avoid may be likely to teleport to the same destination. In any case, it should be appreciated that rendering of avatars within the partial teleport facility does not, itself, represent any additional significant processing or rendering burden since that burden is incurred by the avatar at any location within the current island for each avatar present within that island of which the partial teleport facility is a part although crowding may increase the total image rendering burden and time somewhat. To the extent that avatars may become relatively concentrated in a partial teleport facility, the processing and rendering burden due to crowding may be alleviated by continuing to render the avatar using the same processors used for rendering the avatar in the current island (which is an additional benefit of anchoring the avatar in the current island during partial teleportation) and caching the image data in partial teleport avatar cache 270 from which the avatar image may be viewed by other avatars and their corresponding residents. Since the cache can be updated with relatively small processing burden, limited interaction of the avatar with the partial teleport destination environment including other avatars is thus supported.

An optional feature of the partial teleport operation provided in accordance with the invention is the display of the avatar within the images of the teleport destination in the split screen or frame-in-frame display presented to the resident corresponding to the avatar. In general, display of the avatar will facilitate whatever limited interaction with the teleport destination environment is supported in a given implementation of the invention and is thus preferred and can be achieved in several ways. One simple way to achieve such a display is simply to perform a merging of the image of the avatar with the image of the destination through local processing at the client processor or its local server. Such an image merge, however, does not provide for the application of the physical laws of the destination without substantial additional rendering complexity and transfer of destination metadata. For that reason, it is considered preferable to perform the rendering (as a similar image merge but consistent with the metadata for the teleport destination at the location at which the metadata resides) in connection with the teleport destination on the basis of the avatar image data cached at 270 and to return the display as rendered video which is cached at 260. In either case, and this latter case in particular, the burden of rendering of a partially teleported avatar may be reduced to the degree necessary for the available processing and communication capacity by degrading the image of all partially teleported avatars, possibly to the point of the partially teleported avatars being represented by a greyed, colored or partially transparent silhouette or shadow, through reduced resolution or reduced frame or image update rate. In this regard, it should be noted that the rendering of both fully and partially teleported avatars is a desirable feature of the invention and it is also desirable that partially teleported avatars should be visually distinguishable by virtue of such degraded rendering from fully teleported avatars in the image while the added incremental burden of rendering a degraded image of an additional avatar is not particularly significant. Further, the issue of control of an avatar in two different environments and the consequent increased processing burden is preferably avoided in accordance with the invention by only allowing one instance of a partially teleported avatar to be controlled at any given time while the other instance of the avatar is, in effect, "frozen" and represented by a degraded (e.g. greyed, colored with a single color or low-resolution color space, partially transparent, outline, low update rate, etc.) image, as well.

Figure 3:
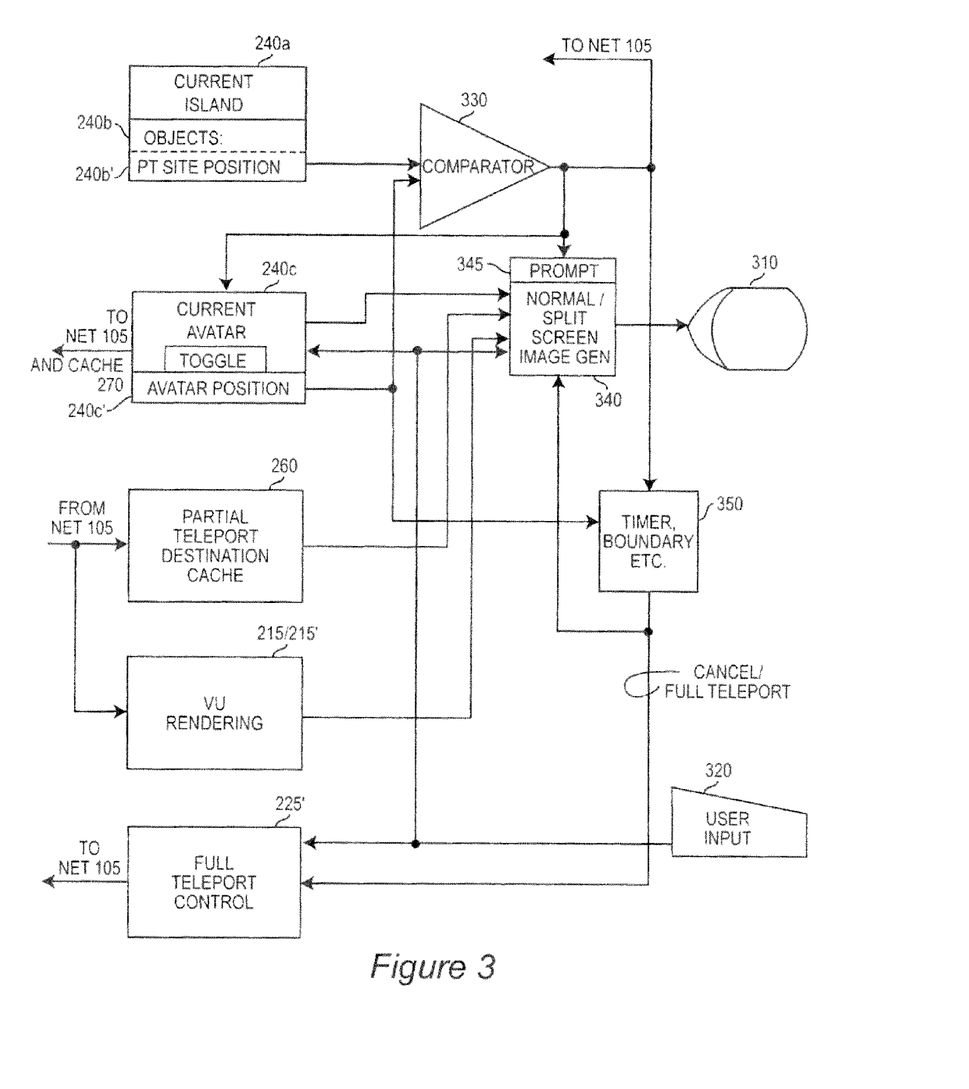
FIG. 3 is a high-level block diagram of a processing architecture and data flow chart implementing an exemplary methodology to provide a preview and limited interaction with a teleport destination.

To accomplish the above functions incident to providing partial teleportation in accordance with the invention a functional architecture preferably similar to that shown as a high-level block diagram or data flow diagram in FIG. 3 is provided. As with FIGS. 1 and 2, FIG. 3 is configured to facilitate explanation of the invention sufficient for its successful practice and should be regarded as exemplary while portions of VU infrastructure not involved in the achievement of the partial teleportation functions discussed above (such as image or metadata outputs of 240*a* and 240*b*) are omitted from FIG. 3 for clarity. Further, it is to be understood that such an architecture is preferably embodied in software, particularly to facilitate interoperability with existing VU infrastructure.

It will be recalled from the foregoing that a PT site or kiosk is preferably handled as an object or as a feature of an island and that one of its properties, in either case, will be a location or position and an area it occupies within the current island as indicated at 240*b'*. Similarly, a property of the current avatar is also a position within the current island as indicated at 240*c'*. To invoke operation of the invention, the avatar position, as controlled from user input 320 (e.g. through movement control, such as walking or flying, or teleporting thereto), is compared at comparator 330 to the position/area of the PT site or kiosk and, if the avatar enters the kiosk such that the avatar position coincides therewith, as determined by comparator 330, an output enabling partial teleportation is issued. This output is coupled to an image generator 340 which drives display 310. The image generator includes a prompt generator which initially issues a prompt to ask the user if partial teleportation in accordance with the invention is desired and preferably indicating the teleport destination(s) which are associated with the teleportation site/kiosk and preferably indicates conditions of the partial teleportation, if selected, such as the duration of the partial teleportation and whether a full teleportation or cancellation thereof will occur alter that duration has expired as determined by a condition detector 350, as will be discussed in greater detail below. If partial teleportation is not desired, other options would include immediate full teleportation or cancellation of teleportation to the associated site, as provided by known VU systems.

The output of comparator 330 also provides a signal to the network to capture and return one or more renderings of the associated destination(s). As properties of the PT site/kiosk, renderings of each associated site are cached in cache 260 and updated from time to time as PT site traffic may require or available communications bandwidth permits. These renderings and updates are preferably much in the nature of a snapshot of the teleport destination as if made with a camera and are available when an avatar enters the PT site/kiosk. The update for the cache may, for example, be a more recent rendering or may include a rendering of a "clone" of the avatar based on avatar image information cached responsive to the output of comparator 330 at cache 270 from current avatar information 240*c*, which may be altered in appearance, also preferably responsive to the output of comparator 330 and/or the response to prompt 345 from user input 320.

The output of comparator 330, together with the user input response to prompt 345 also controls image generator 340 to initiate a split screen or frame-in-frame display mode as alluded to above. In such a mode, image generator 340 accepts not only VU rendering information 215/215' but also input from the teleport destination cache 260. As alluded to above, the information in cache 260 is initially an image of a portion of the teleport destination site but is preferably updated shortly thereafter and as often as may be practical to include the image of a cloned avatar and/or to reflect any action or movement (e.g. of the avatar or point of view) controlled by the user at input 320.

The output of comparator 340 also activates a condition detector 350 which preferably includes a timer, and a boundary detector similar to location comparator 330 but configured to detect egress of the avatar from the PT site/kiosk and, preferably, the location of such egress relative to the site/kiosk. The output of condition detector 350 is provided to the control for full teleportation 225' included among controls 225 of FIG. 2 in order to cause the partial teleport to be resolved into a full teleport or cancellation thereof after a particular time or upon the egress of the avatar from the PT site/kiosk. The output of condition detector 350 is also provided to image generator 340 to return the display to normal mode with the avatar in a location in the original island adjacent to the PT site/kiosk or in the teleport destination (which may even be in a different VU). It should be noted in this regard, that, since no metadata need be transferred and only minimal, if any, rendering or image manipulation performed for the partial teleportation, that cancellation of full teleportation can return the user to normal VU operation in the current island and location nearly instantaneously. If full teleportation is selected either manually from user input 320 or automatically responsive to condition detector 350, the data in the partial teleportation destination cache 260 is available to supply an image of the destination, possibly and preferably including an image of the avatar which can be changed from its partially teleported appearance to its normal appearance by updating of data cached at cache 260 while metadata is transferred and new rendering performed. Doing so in such a manner provides an enhancement to the full teleport operation in that it gives both an immediate indication of the system response during a full teleportation operation and provides an illusion of enhanced speed and reduced response time while avoiding interruption of the display to the user by supplying a changing image while the full teleportation operation is carried out and the possibility of a substantially seamless transition to an image rendered in the normal course of VU operation.

Figure 4:
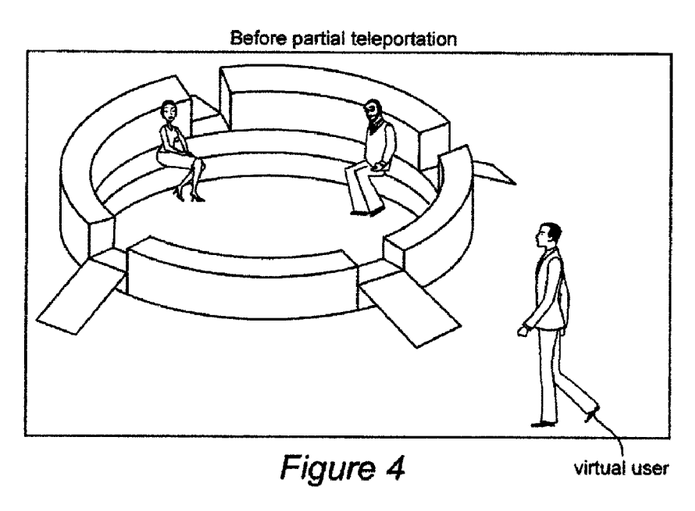
FIGS. 4 and 5 are exemplary displays that would be seen by a resident in the course of operation of the invention.
Figure 5:
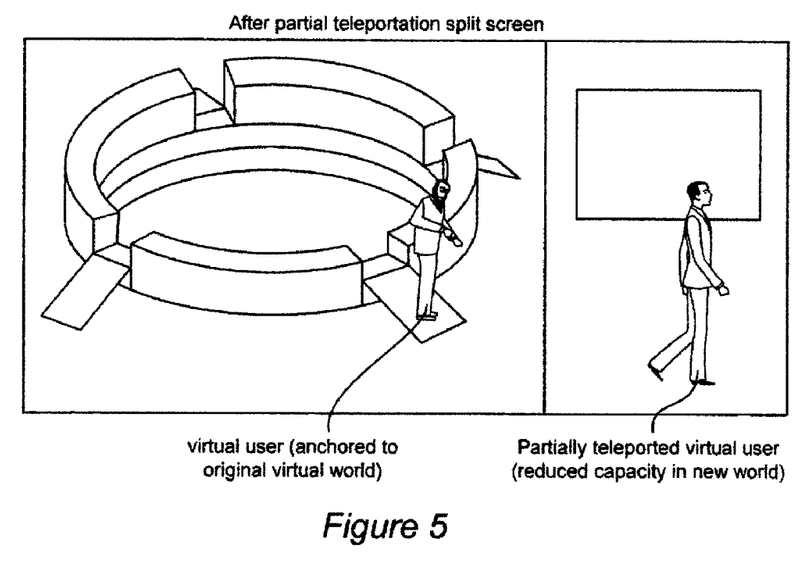

As a perfecting feature of the invention which is not necessary to the practice of the invention in accordance with its basic principles, the PT site/kiosk can be configured, as graphics exemplified in FIG. 4, in such a way that the image (s) of the teleport destination of interest "seen" by the avatar and displayed to the user may be viewed on the inner side of the perimeter of the PT site/kiosk (or the original and destination environment images otherwise superimposed on each other with suitable degrees of transparency for portions of each) after the avatar has entered the PT site/kiosk. The avatar may then decline a teleport operation by leaving the kiosk or directly initiate a teleport operation from the kiosk by any of a number of possible actions taken by the avatar while at such a location and viewing an image of the destination. Moreover, when a teleportation operation is initiated, well understood image manipulations may be employed as the destination is rendered to, for example, merge the rendered graphics with the destination image already displayed to accelerate the time at which a relatively high-quality image of the destination can be displayed. The avatar can then begin to interact with the destination environment.

In view of the foregoing, it is seen that the invention provides a means and method for performing a partial teleport operation in addition to the full teleport operation provided in known VU systems which allows for at least a view of a teleportation destination of interest and some limited interaction therewith (much is the manner of providing a sample or demonstration version of software with which a user may interact to a limited or arbitrarily great degree) without incurring the processing overhead of rendering the avatar in the new environment (by providing an image merge or the like), deletion of the avatar from the originating environment, tracking avatar movements in only one location, performing security authentication and authorization and transfer of metadata. Rather, the invention provides for the avatar to be anchored in the originating location/island and, if desired, cloning the avatar in the teleportation destination; allowing as much or as little interaction therewith as may be desired or practical (e.g. the cloned avatar may "chat" with other avatars or cloned avatars in its proximity in the teleportation destination) while allowing a substantially instantaneous return to the originating location if full teleportation is canceled. Such operations may be invoked automatically by the VU system during periods of high processing load to maintain acceptability of VU performance or the appearance thereof to a user.

The invention also provides, through use of a partial teleportation site, preferably in the form of a virtual kiosk or the like, a convenient, non-intrusive and intuitively usable interface for control of teleportation. The interface also may serve as a basis for providing a convenient and functionally more attractive VU presence for a business or the like to attract visits from avatars by reducing processing time consumption and delays incident to full teleportation. Moreover, the invention and the interface provided thereby provide the appearance of faster teleportation response time with display enhancement and optionally can provide further enhanced display effects and earlier completion of full teleportation operations.

In providing such effects, no difficulties are engendered by a cloned avatar since the invention provides for only one instance of the avatar to be controlled at any given time and which the user can toggle between, possibly using a drop down menu familiar to those skilled in the display arts while the avatar and its clone may be made visually distinct from the normal appearance of the avatar in a manner which also reduces rendering and data processing burden through avatar images that may be degraded in a variety of ways. In any event, the rendering operation is not initiated until the full teleportation operation is begun while an image of the teleportation destination can be provided quickly which supports a degree of avatar interaction therewith and supports a smooth and virtually seamless transition to the rendered image upon full teleportation while effectively hiding the rendering delay from the user. Additionally, the partial teleportation facility or kiosk can be associated with particular teleportation destinations and can thus function to promote and facilitate viewing and limited interaction therewith by an avatar without imposing significant processing burden on the system.

Figure 6:
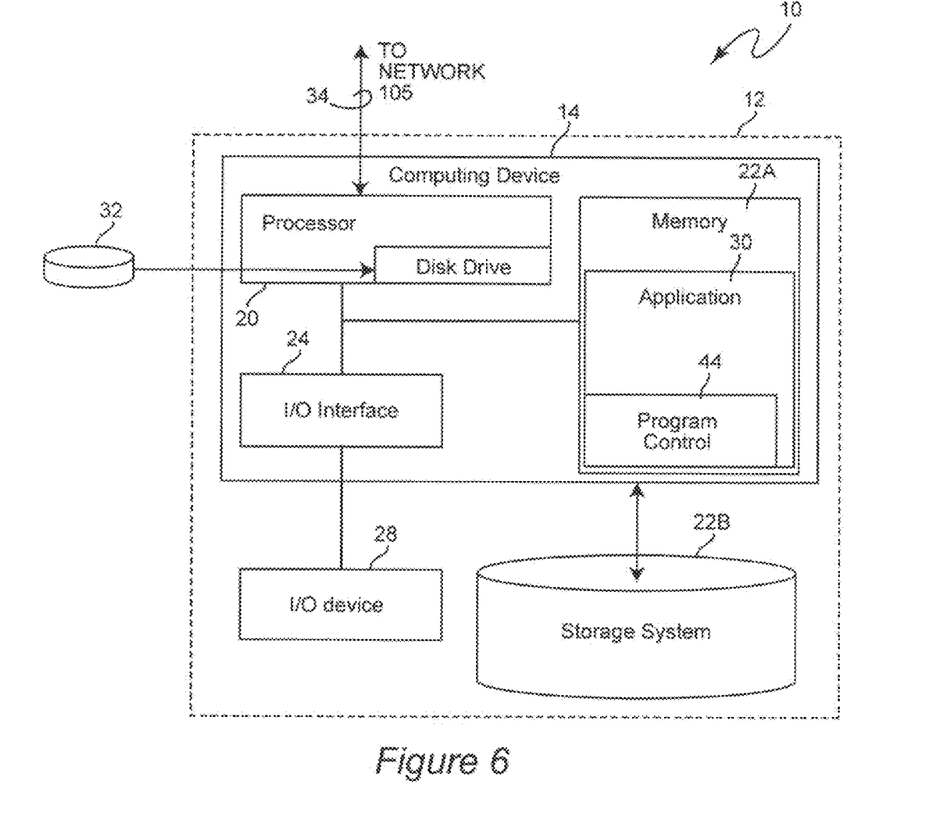
FIG. 6 illustrates a suitable processor architecture for use as a server or client in FIG. 1.

While shown and described herein as a method and a system, it is understood that the invention further provides various alternative embodiments. For example, in one embodiment shown in FIG. 6, the invention provides a computer-readable/useable medium 22B that includes computer program code to enable a computer infrastructure to automatically manage teleportation movements between locations in virtual environments while determining suitability of requested destinations. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc., collectively depicted at 32), or on one or more data storage portions or a computing device, such as the memory 22A and/or the storage system 22B (e.g., a fixed disk, a read-only memory, a random access memory, a cache memory, etc.), and/or as a data signal 34 (e.g., a propagated signal) traveling over a network 105 as depicted in FIG. 1 (e.g., during a wired/wireless electronic distribution of the program code).

Still yet, computer infrastructure 10 is intended to demonstrate that some or all of the components of implementation could be deployed, managed, serviced, etc. by a service provider who offers to implement, deploy, and/or perform the functions of the present invention for automatically managing teleportation movements between locations in virtual environments while determining suitability of requested destinations, for example by licensing methods and browser or application server technology according to the present invention to an internet service provider (ISP) or cellular telephone provider. In one embodiment the invention may comprise a business method that performs the process steps of the invention on a subscription, advertising, and/or fee basis. Thus a service provider can create, maintain, support, etc., a computer infrastructure 12 including computing device 14, such as the computer infrastructure 10 that performs the process steps of the invention for automatically manage teleportation movements between locations in virtual environments while determining suitability of requested destinations, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of an application 30 comprising a set of instructions including program control 44 intended to cause a computing device 20 having an information processing capability to perform a particular function either directly or after either or both of the following: (a) conversion to another language, code or notation; and/or (b) reproduction in a different material form. To this extent, program code can be embodied as one or more of: an application/software program, component softs ware/a library of functions, an operating system, a basic I/O system/driver 24 for a particular computing and/or I/O device 28, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

While the invention has been described in terms of a single preferred embodiment, those skilled in the art will recognize that the invention can be practiced with modification within the spirit and scope of the appended claims.

What is claimed is:

1. A method for previewing a teleportation destination in a virtual universe, said method including:
   establishing a location in said virtual universe at which a partial teleportation to said teleportation destination can be performed;
   caching an image of a portion of said teleportation destination;
   moving an avatar to said location in said virtual universe while said avatar is anchored in said virtual universe; and
   in response to said step of moving an avatar to said location, displaying said image of a portion of said teleportation destination concurrently with display of an image of said avatar at said location in said virtual universe to a user corresponding to said avatar.

2. A method as recited in claim 1, further including the initiating a full teleportation operation from said location.

3. A method as recited in claim 2, wherein rendering is performed in connection with said full teleportation operation and wherein said displaying step includes a step of
   supplementing said rendering with said image of a portion of said teleportation destination.

4. A method as recited in claim 2, wherein said full teleportation operation is initiated responsive to a condition detection at said location.

5. A method as recited in claim 1, further including the:
   providing a partial teleportation facility at said location; and
   performing said displaying step in connection with said partial teleportation facility.

6. A computer program product comprising a non-transitory computer readable medium storing instructions comprising a program to control operations of a data processor, said program, when run on said data processor, causing said data processor to perform steps of: establishing a location in a virtual universe at which a partial teleportation to a teleportation destination can be performed; caching an image of a portion of said teleportation destination; moving an avatar to said location in said virtual universe while said avatar is anchored in said virtual universe; and in response to said step of moving an avatar to said location, displaying said image of a portion of said teleportation destination concurrently with display of an image of said avatar in said teleportation facility to a user corresponding to said avatar.

7. A computer program product as recited in claim 6, including performing the further step of:
   initiating a full teleportation operation from said location.

8. A computer program product as recited in claim 7, wherein rendering is performed in connection with said full teleportation operation and wherein said displaying step includes supplementing said rendering with said image of a portion of said teleportation destination.

9. A computer program product as recited in claim 7, wherein said full teleportation operation is initiated responsive to a condition detection at said location.

10. A computer program product as recited in claim 6, further including:
    providing a partial teleportation facility at said location; and
    performing said displaying step in connection with said partial teleportation facility.

11. A virtual universe system including at least one computer or special purpose processor configured to provide:
    an object at a location within said virtual universe from which partial teleportation to a teleportation destination can be performed;
    a location comparator for determining presence of an avatar at said location;
    an image cache for storing data representing an image of a portion of a teleportation destination; and
    an image generator for displaying to a user corresponding to said avatar said image of said portion of said teleportation destination concurrently with displaying to said user an image of said avatar at said object, responsive to detected presence of said avatar at said object.

12. A system as recited in claim 11, further including
    a condition detector for detecting a condition at said object and initiating a full teleportation operation in response to detection of said condition.

13. A system as recited in claim 12, wherein said condition is a duration of presence of an avatar at said location of said object.

14. A system as recited in claim 11, wherein said image generator generates an image in split screen or frame-in-frame format.

15. A system as recited in claim 11, wherein said image generator includes means for displaying an image of said avatar in connection with said image of said teleportation destination.

16. A system as recited in claim 15, further including means for selecting control of said avatar at said location or controlling said image of said avatar.

17. A method of presenting an image of a teleportation destination in a virtual universe, said method comprising, defining an object corresponding to a teleportation destination at a location in said virtual universe at which partial teleportation to said teleportation destination may be performed, and displaying to a user corresponding to an avatar a portion of said teleportation destination corresponding to said object concurrently with an image of said avatar in connection with said object when said avatar is located at said location without teleporting said avatar to said teleportation destination.

18. A method as recited in claim 17, further including a step of initiating a full teleport operation upon detection of a condition at said object.

19. A method as recited in claim 18, wherein said condition is duration of presence of said avatar at said location.

20. A method as recited in claim 17, wherein said object is sponsored or owned by a user associated with said teleportation destination.

21. A method of operating a virtual universe system on a plurality of networked data processors to provide the appearance to a user of teleportation without delays due to rendering of said teleportation destination in connection with teleportation, said method comprising configuring at least one data processor of said plurality of data processors to provide an object at a location within said virtual universe from which partial teleportation to a teleportation destination can be performed;

a location comparator for determining presence of an avatar at said location;

an image cache for storing data representing an image of a portion of said teleportation destination; and an image generator for displaying to a user corresponding to said avatar said image of said portion of said teleportation destination concurrently with an image of said avatar at said object, responsive to detected presence of said avatar at said location.

* * * * *